United States Patent
Goins et al.

[19]

[11] Patent Number: 6,003,616
[45] Date of Patent: Dec. 21, 1999

[54] WHEEL ARM ASSEMBLY INTERCHANGEABLE BETWEEN WALKING BEAM AND STRAIGHT TANDEM CONFIGURATIONS

[75] Inventors: Garrett Lee Goins, Rhodes; James Franklin Bierl, West Des Moines, both of Iowa

[73] Assignee: Deere & Company, Moline, Ill.

[21] Appl. No.: 09/045,664

[22] Filed: Mar. 20, 1998

[51] Int. Cl.[6] .................................................. A01B 73/00
[52] U.S. Cl. ............................................................ 172/669
[58] Field of Search .................................. 172/669, 671, 172/421, 400, 383; 180/209, 219; 280/677

[56] References Cited

U.S. PATENT DOCUMENTS

| | | | |
|---|---|---|---|
| 642,145 | 1/1900 | Moon | 172/664 X |
| 671,002 | 4/1901 | Rough | 172/669 X |
| 1,842,808 | 1/1932 | Strandlund | 172/671 X |
| 2,687,075 | 8/1954 | Hupp | 172/669 X |

OTHER PUBLICATIONS

Deere & Company brochure entitled "Primary Tillage Tools", front/back cover and page 5, publish date–Feb. 1996, published in U.S.A.

Deere & Company brochure entitled "Tandem & Offset Disks", front/back cover and pages 14 and 16, publish date–Feb. 1997, published in U.S.A.

*Primary Examiner*—Christopher J. Novosad

[57] ABSTRACT

A wheel arm assembly for an implement includes a common wheel arm for single wheel, straight tandem wheel, or walking beam configurations. In the straight tandem configuration, a pair of spindles are supported in corresponding bushings at the end of the wheel arm. The spindles are axially aligned, project outwardly from the arm, and support a pair of wheels in tandem. To convert to the optional walking beam configuration, the operator removes the spindles from the bushings and inserts a long pin through a selectively attachable walking beam casting and through the bushings in the arm. The same spindles that attach the wheels to the arm in the conventional tandem configuration are inserted in the offset ends of the walking beam to support the wheels from the walking beam casting.

13 Claims, 2 Drawing Sheets

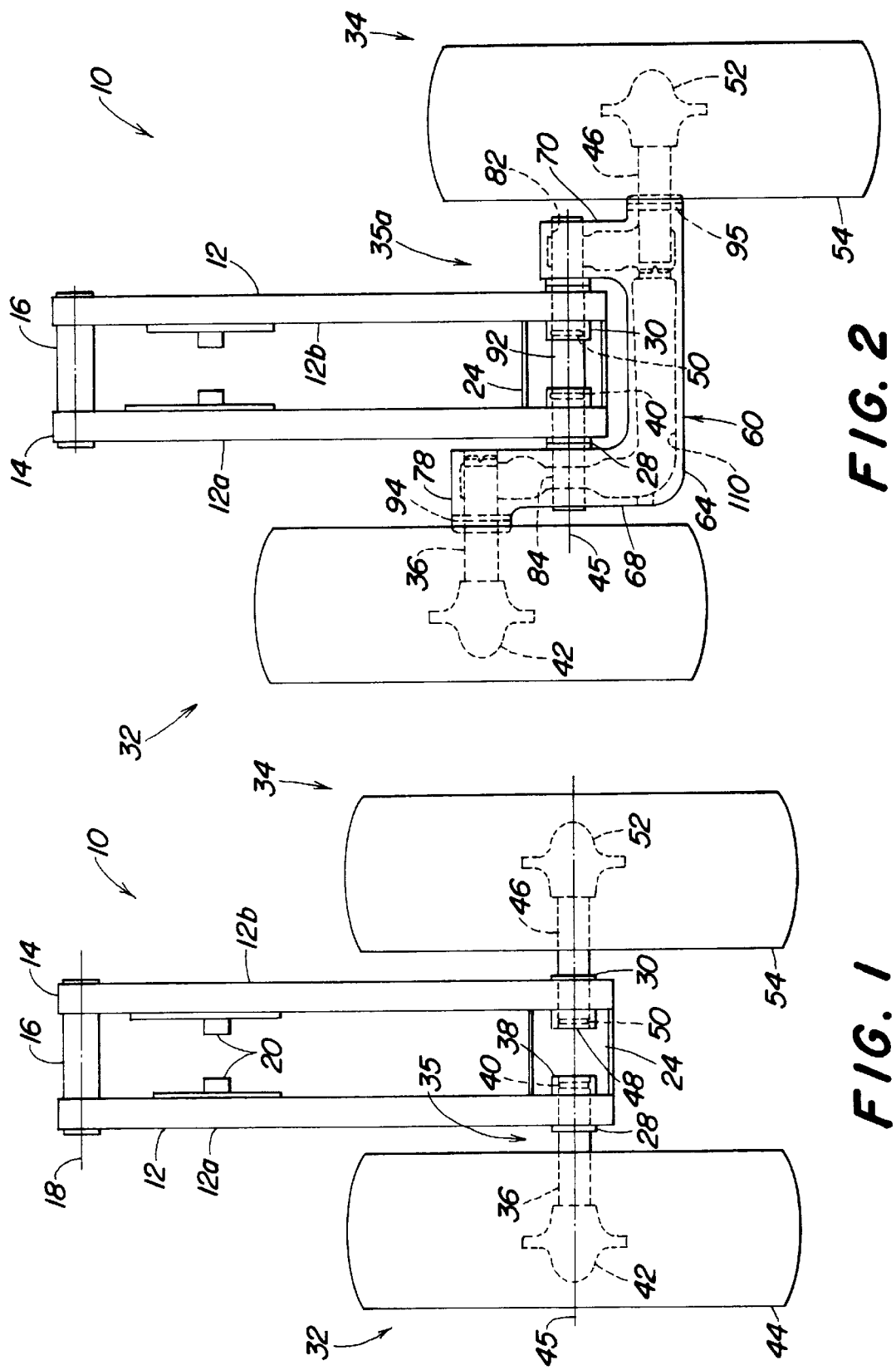

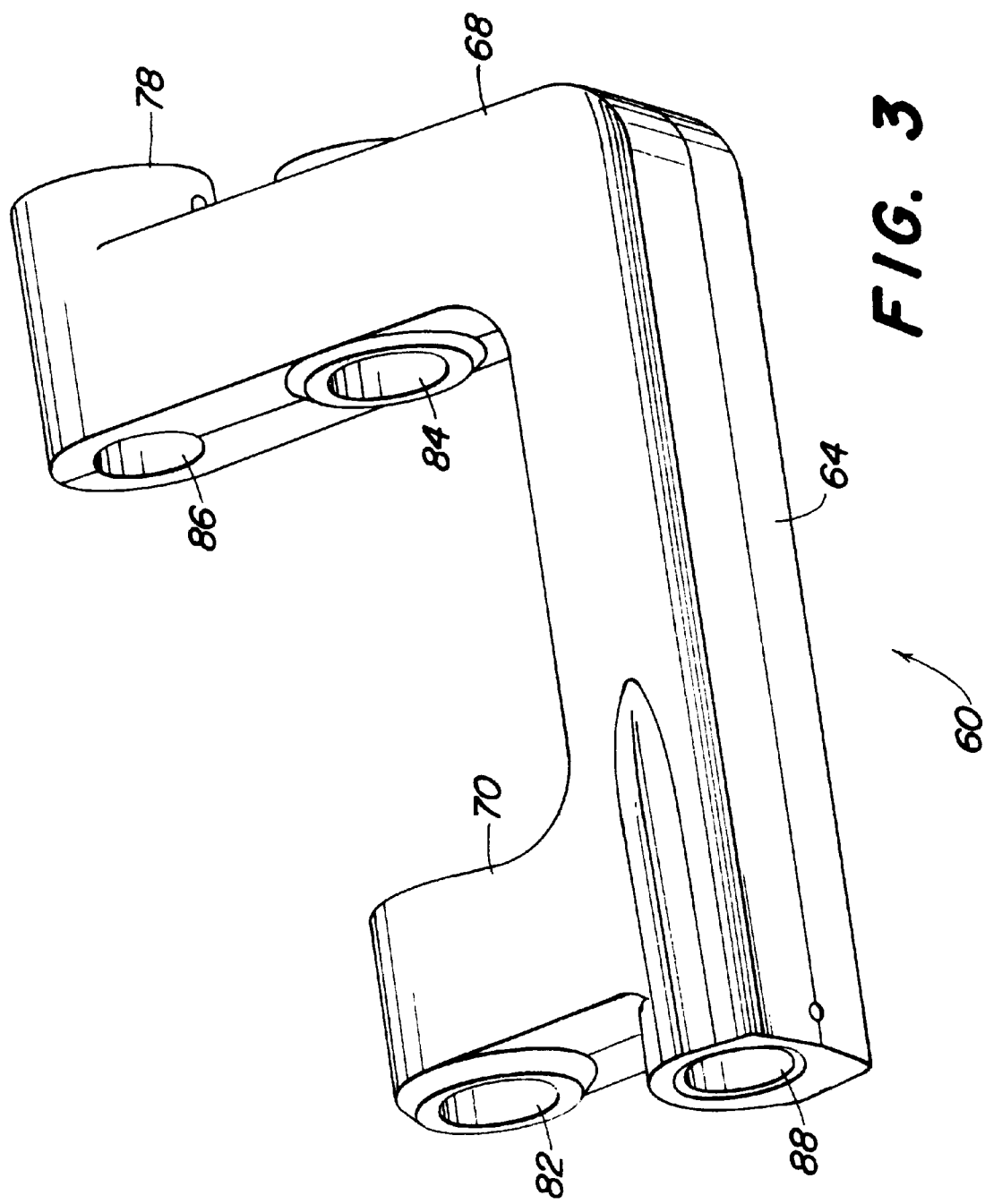

WHEEL ARM ASSEMBLY INTERCHANGEABLE BETWEEN WALKING BEAM AND STRAIGHT TANDEM CONFIGURATIONS

BACKGROUND OF THE INVENTION

1) Field of the Invention

The present invention relates generally to agricultural implements, and, more specifically, to ground wheel supports for such implements.

2) Related Art

Agricultural implements such as disk harrows, chisel plows, field cultivators or the like include main and wing frames supported above the ground by wheel arm assemblies. Each wheel arm assembly has a wheel arm with an upper end pivotally connected to the frame and lower end supporting a single wheel or a pair of wheels. Depending on the application and tool layout on the frames, the pair of wheels are connected to the arm assemblies in a standard straight tandem (dual wheel) arrangement or in an optional offset walking tandem arrangement. In the standard straight tandem or dual wheel arrangement, the wheels are supported on axially aligned wheel spindles projecting from opposite sides of wheel arms. If the optional walking beam arrangements are needed, the standard wheel assemblies are replaced with specially designed and manufactured wheel arm assemblies.

The need for two different types of wheel arm assemblies increases the number of weldments that must be manufactured and the number of parts that must be stocked thereby substantially increasing the costs of providing both the standard and optional assemblies. If an operator orders an implement with one type of wheel assembly and later decides the other type is necessary because of a change in operating conditions, tool locations or the like, making the switch is costly since entire new assemblies must be purchased. Also, changing over from one type of wheel assembly to the other can be inconvenient and time consuming.

BRIEF SUMMARY OF THE INVENTION

It is therefore an object of the present invention to provide an improved wheel arm assembly for an implement lift or depth control system. It is a further object to provide such an improved system which overcomes most or all of the aforementioned problems.

It is another object of the present invention to provide a wheel arm assembly for an implement which may be changed easily and inexpensively between a straight tandem arrangement and a walking beam arrangement. It is a further object to provide such an assembly which reduces the number of weldments necessary. It is still another object to provide such an assembly which utilizes a common wheel arm for both the straight tandem and the walking beam arrangements. It is yet another object to provide such an assembly which also wherein the common wheel arm may also be utilized for a single wheel configuration for a wing frame.

It is still a further object of the present invention to provide an implement wheel arm assembly which converts easily between a straight single or a straight dual configuration and a walking tandem configuration. It is a further object to provide such an assembly which advantageously utilizes a common wheel arm and common wheel spindles with any of the selected configurations. It is yet another object to provide such an assembly which permits a customer to change from a previously purchased configuration to the other type of configuration without need to purchase new wheel arm assemblies.

A wheel arm assembly for an implement includes a common wheel arm for single wheel, straight dual wheel, or walking beam configurations. In the straight tandem configuration, a pair of spindles are supported in corresponding bushings at the end of the wheel arm. The spindles are axially aligned, project outwardly from the arm, and support a pair of wheels in tandem. For a single wheel configuration, one wheel is supported from one side of the wheel arm. To convert a straight dual or a single wheel configuration to the optional walking beam configuration, the operator simply removes the spindles from the bushings in the arm and inserts a long pin through a selectively attachable walking beam and through the bushings. The same spindles that attach the wheels to the arm in the straight tandem configuration are inserted in the offset ends of the walking beam to support the wheels from the beam. The walking beam preferably is fabricated as a special one-piece casting for strength, compactness, and elimination of weldments to reduce manufacturing costs. Unique wheel arms for the different wheel configurations are eliminated, and a customer can order an implement with one type of configuration and later switch to the other configuration relatively inexpensively without having to purchase new wheel arm assemblies. The changeover from one type of configuration to the other is quick and simple and provides improved implement versatility for adjusting to different conditions and implement configurations.

These and other objects, features and advantages of the present invention will become apparent to one skilled in the art upon reading the following detailed description in view of the drawings.

BRIEF DESCRIPTION OF THE DRAWINGS

FIG. 1 is a top view of a wheel arm assembly with ground wheels in a straight tandem configuration.

FIG. 2 is a top view similar to that of FIG. 1 but showing the arm assembly with a walking beam attached and supporting the ground wheels in a walking beam configuration.

FIG. 3 is a perspective view of the walking beam casting utilized in the walking beam configuration shown in FIG. 2.

DETAILED DESCRIPTION OF THE DRAWINGS

Referring now to FIG. 1, therein is shown a ground wheel support arm assembly 10 for mounting on the frame of a conventional implement (not shown) such as a disk or chisel plow. The arm assembly 10 includes a fore-and-aft extending wheel arm 12 including tubular side arm members 12a and 12b. The arm 12 includes an upper end 14 with a pivot 16 connecting the members 12a and 12b. The assembly 10 is connected by the pivot 16 to the frame for rocking about a transverse axis 18 to raise and lower the frame relative to the ground by a hydraulic cylinder (not shown) having a rod end pinned to cylinder brackets 20 on the arm 12. A connecting member 24 extends between the lower ends of the members 12a and 12b. Transversely aligned spindle receiving bushings 28 and 30 extend through and are fixed to the lower ends of the tubular members 12a and 12b in an area adjacent the connecting member 24.

Ground wheel assemblies 32 and 34 are connected to wheel support structure 35 at the lower end of the wheel arm 12 for movement vertically relative to the implement frame as the arm assembly 10 is rocked about the transverse axis 18. The wheel assembly 32 includes a transversely extending spindle 36 having an inner apertured end 38 selectively insertable in and removable from the bushing 28. The bushing 28 includes apertures at 40 which align with the aperture in the end 38. To secure the spindle 36 to the bushing 28, a pin is inserted through the apertures at 40. The spindle 36 extends outwardly from the tubular member 12a to a connection with a wheel bearing assembly 42 which supports a ground engaging wheel 44 for rotation about a transverse wheel axis 45. The wheel assembly 34 is generally identical to the wheel assembly 32 and includes a spindle 46 having in inner apertured end 48 selectively insertable in and removable from the bushing 30. The bushing 30 includes apertures at 50 which align with a corresponding aperture in the end 48 and which receive a pin for securing the spindle 46 in the position shown in FIG. 1. The spindle 46 as shown is axially aligned with the spindle 36, and a wheel bearing assembly 52 supports a second ground engaging wheel 54 from the outer end of the spindle 46 for rotation about the transverse wheel axis 45. The support arrangement as shown in FIG. 1 provides a straight tandem or straight dual wheel arrangement with the rotational axes of the wheels 44 and 54 fixed relative to the wheel arm 10. Although two wheel assemblies are shown in FIG. 1, it is to be understood that for certain applications, such as for supporting a small wing frame, a single wheel assembly could be utilized on one side only of the wheel arm 12.

To convert the arm assembly 10 from the straight tandem arrangement shown in FIG. 1 to a walking tandem arrangement as shown in FIG. 2, wheel support structure 35a further includes a walking beam 60 selectively attachable to the spindle receiving area adjacent the member 24 when the spindles 36 and 46 are removed from the bushings 28 and 30. The walking beam 60 includes a U-shaped member having a bight portion 64 with side legs 68 and 70 extending from the bight portion. Pin receiving, axially aligned transverse bores 82 and 84 are formed in the upper portion of the side leg 70 and in the central portion of the side leg 68 to define a beam pivot area. The side leg 68 includes an extension 78 with a spindle receiving bore 86 for receiving the spindle 36. The opposite side of the bight portion 64 includes a second spindle receiving bore 88 for receiving the spindle 46.

The side legs 68 and 70 are transversely spaced by the bight portion 64 to fit over the end of the wheel arm 12 and provide clearance for pivoting of the beam 60 relative to the arm 12. After the spindles 36 and 46 are removed from the arm 12, the walking beam 60 is pivotally connected to the end of the arm 12 by an elongated pin 92 for rocking about the axis 45. The bores 82 and 84 in the walking beam 60 are aligned with bushings 28 and 30, and the pin 92 is inserted through the bores and the bushings. Pins are inserted at the locations 40 and 50 to secure assembly in position on the arm 12. The same wheel assemblies 32 and 34 utilized with the straight tandem arrangement of FIG. 1 are mounted on the walking beam 60 by inserting the ends 38 and 48 of the spindles 36 and 46 into the bores 86 and 88, respectively, and securing the spindles by placing pins through the apertures in the spindles and through apertures in the beam 60 at locations 94 and 95 (FIG. 2). Preferably, the walking beam 60 is fabricated as a unitary casting (FIG. 3) to eliminate a weldment and provide strength and compactness. The casting has a hollow interior (see 110 of FIG. 2) and gussets at the bore locations (FIG. 3) for strength.

Having described the preferred embodiment, it will become apparent that various modifications can be made without departing from the scope of the invention as defined in the accompanying claims.

We claim:

1. A selectively configurable lift wheel arm assembly for an agricultural implement comprising:
   a wheel arm having an upper end adapted for support by the implement and a lower end;
   a spindle receiving area located in the lower end; and
   wheel support structure selectively supporting first and second wheels in a first configuration from the spindle receiving area with wheels having axes of rotation fixed relative to the wheel arm, and in a second configuration from the spindle receiving area wherein the axes of the wheels are movable relative to the wheel arm so that the wheels can move vertically relative to each other, thereby providing selective wheel configurations from a single wheel arm.

2. The wheel arm assembly as set forth in claim 1 wherein the wheel support structure comprises first and second spindles projecting outwardly from the spindle receiving area on opposite sides of the wheel arm and supporting the wheels for rotation about a common axis when the wheel support structure is in the first configuration, and a walking beam selectively attachable to the spindle receiving area for pivoting about the common axis when the wheel support structure is in the second configuration.

3. The wheel arm assembly as set forth in claim 2 wherein the wheel support structure further comprises walking beam pin structure selectively replacing the first and second spindles when the wheels are in the second configuration, and a walking beam having opposite offset ends receiving the first and second spindles and attachable to the walking beam pin structure when the wheels are supported in the second configuration.

4. The wheel arm assembly as set forth in claim 2 wherein the walking beam comprises a U-shaped casting having a bight portion and opposed side legs, a first spindle mounting area located in the bight portion, and a leg extending from one of the side legs and including a second spindle mounting area, the first and second spindle mounting areas receiving the first and second spindles when the wheels are in the second configuration.

5. The wheel arm assembly as set forth in claim 4 wherein the U-shaped casting includes a pivot area located in the side legs and received by the spindle receiving area.

6. Walking beam wheel support structure for a fore-and-aft extending wheel arm of an agricultural implement, the wheel arm having an end with a spindle receiving area for selectively receiving removable wheel spindle structure supporting a first wheel for rotation about a transverse axis generally fixed relative to the wheel arm, the walking beam wheel support structure including a walking beam having pivot structure adapted for support by the spindle receiving area when the wheel spindle structure is removed, the walking beam wheel support structure also including spindle support areas offset from the pivot structure and supporting a pair of wheels in a walking beam configuration from the wheel arm when the wheel spindle structure is removed.

7. The walking beam support structure as set forth in claim 6 wherein the walking beam comprises a generally U-shaped member having a bight portion, a side leg extending from the bight portion and a first wheel support area located in the side leg.

8. The walking beam support structure as set forth in claim 7 wherein the U-shaped member includes a second wheel support area in the bight portion.

9. The walking beam support structure as set forth in claim 8 wherein the pivot structure is located between the first and second wheel support areas.

10. The walking beam support structure as set forth in claim 7 wherein the walking beam comprises a hollow casting with gussets in the first and second wheel support areas.

11. The walking beam support structure as set forth in claim 6 including a second wheel, and wherein the removable wheel spindle structure comprises first and second spindles supporting the first wheel and the second wheel, the spindle support areas including first and second support locations receiving the respective first and second wheel spindles.

12. The walking beam support structure as set forth in claim 11 including a pivot pin selectively positionable through the pivot structure and the spindle receiving area when the wheel spindle structure is removed from the spindle receiving area.

13. The walking beam support structure as set forth in claim 6 including a pivot pin selectively positionable through the pivot structure and the spindle receiving area when the wheel spindle structure is removed from the spindle receiving area.

* * * * *